United States Patent
Rasmussen et al.

(10) Patent No.: US 6,845,747 B2
(45) Date of Patent: Jan. 25, 2005

(54) METHOD OF UTILIZING MULTIPLE FUEL INJECTIONS TO REDUCE ENGINE EMISSIONS AT IDLE

(75) Inventors: Jason J. Rasmussen, Sparland, IL (US); Kevin P. Duffy, E. Peoria, IL (US); Kurtis M. Best, Princeville, IL (US); Matthew R. Roth, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 183 days.

(21) Appl. No.: 10/191,740

(22) Filed: Jul. 9, 2002

(65) Prior Publication Data

US 2004/0007203 A1 Jan. 15, 2004

(51) Int. Cl.$^7$ ................................................. F02B 3/12
(52) U.S. Cl. ...................................... 123/299; 123/294
(58) Field of Search ................................. 123/299, 300, 123/294

(56) References Cited

U.S. PATENT DOCUMENTS

| | | | | |
|---|---|---|---|---|
| 4,567,868 A | * | 2/1986 | Yasuhara | ..................... 123/300 |
| 4,836,161 A | * | 6/1989 | Abthoff et al. | .............. 123/299 |
| 5,492,098 A | | 2/1996 | Hafner et al. | |
| 5,740,775 A | * | 4/1998 | Suzuki et al. | ................ 123/299 |
| 6,012,429 A | | 1/2000 | Beatty et al. | |
| 6,161,519 A | * | 12/2000 | Kimura et al. | ............... 123/299 |
| 6,332,447 B1 | * | 12/2001 | Kimura et al. | ............... 123/299 |
| 6,467,452 B1 | * | 10/2002 | Duffy et al. | ................. 123/299 |

* cited by examiner

Primary Examiner—Tony M. Argenbright
(74) Attorney, Agent, or Firm—Liell & McNeil

(57) ABSTRACT

A method for operating an engine at idle that reduces $NO_x$ and controls smoke and hydrocarbon emissions. An idle delivery quantity of fuel is determined and divided into a first quantity of fuel and a second quantity of fuel in approximately equal quantities. During a compression stroke of an engine piston, the first quantity of fuel is injected into an engine cylinder. Adjusting at least one of timing and quantity of the injection of the first quantity of fuel reduces, at least in part, $NO_x$ emissions. At a timing angle of at least thirty degrees after the first quantity of fuel is injected and after the first quantity of fuel has been burned, there is an injection of the second quantity of fuel. Adjusting at least one of timing and quantity of the injection of the second quantity of fuel reduces, at least in part, smoke emissions.

20 Claims, 3 Drawing Sheets

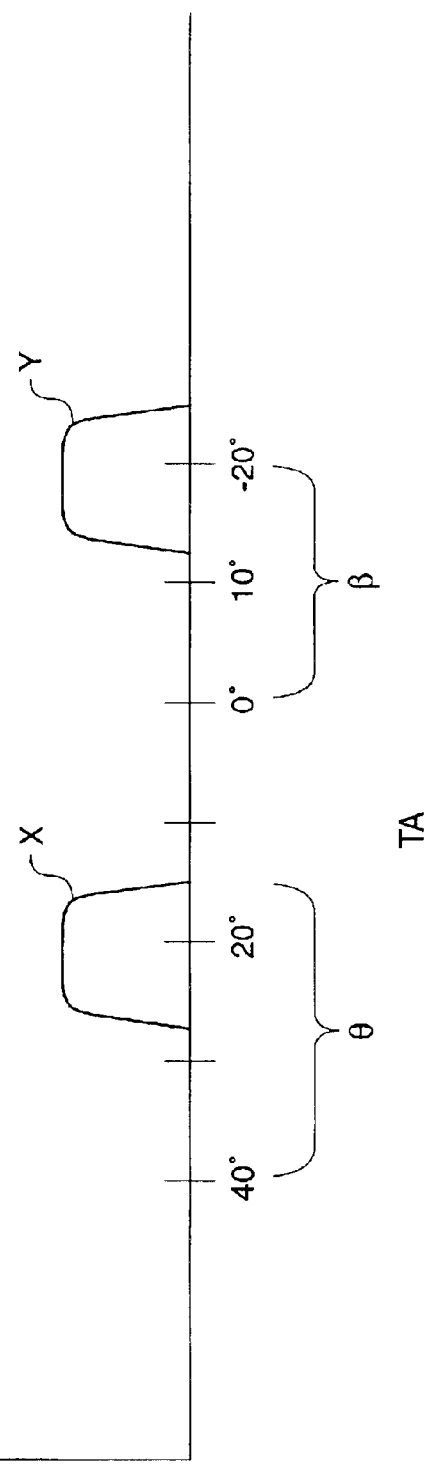

METHOD OF UTILIZING MULTIPLE FUEL INJECTIONS TO REDUCE ENGINE EMISSIONS AT IDLE

TECHNICAL FIELD

The present invention relates generally to diesel engines, and more particularly, a method for reducing undesirable emissions from diesel engines operating at idle.

BACKGROUND

Engineers are constantly seeking ways to reduce undesirable engine emissions without over reliance upon exhaust after treatment techniques. One strategy is to seek ways to improve performance of fuel injection systems at idle. Over the years, engineers have come to learn that engine emissions can be a significant function of the timing, the number, and the quantity of fuel injections. However, engineers have often found that adjustments in the fuel injection system that result in a reduction of $NO_x$ emissions may result in an increase of hydrocarbon and particulate emissions, and vice versa.

For instance, fuel injection systems such as that shown in co-owned U.S. Pat. No. 5,492,098 issued to Hafner et al. on Feb. 20, 1996 use a split fuel injection near top dead center of the engine piston's compression stroke. To begin an injection event, hydraulic pressure acts on a plunger within a fuel injector causing the plunger to advance and pressurize fuel. Further, the pressure on an opening hydraulic surface of a needle valve increases causing the nozzle outlets to open and fuel to be injected into an engine cylinder. As the plunger further advances, a fuel pressurization chamber is briefly in fluid communication with a prime spill port causing the pressure within the fuel pressurization chamber to drop. Thus, the pressure acting on the opening hydraulic surface of the needle valve member is insufficient to hold open the nozzle outlets and continue with the injection event. The pressure briefly drops below valve closing pressure, which allows the needle valve to close. After the plunger advances past the prime spill port, pressure increases within the fuel pressurization chamber and is sufficient to open the nozzle outlets and resume the injection event. The second shot of fuel is generally of a greater quantity than the first shot of fuel.

Although the strategy of the split injection has performed well, there is room for improvement. Although attempts to run a split injection at idle have led to some reduction in undesirable emissions, hydrocarbon and $NO_x$ emissions can be further reduced. Moreover, because the two shots of fuel are determined by component geometry rather than electronic control, engineers have difficulty in adjusting the timing and the quantity of each shot to further reduce $NO_x$, hydrocarbon and smoke emissions. Because it is difficult to control the quantity of fuel spilled through the spill port between shots, the quantity of fuel being injected into each engine cylinder varies between fuel injectors and injection events, causing the engine to exhibit unsteady behavior when operating at idle that can be irritating to an operator.

The present invention is directed to overcoming one or more of the problems set forth above.

SUMMARY OF THE INVENTION

In one aspect of the present invention, there is a method of operating an engine at idle. A first quantity of fuel is injected during a compression stroke of the engine piston. At a timing angle of at least thirty degrees after the start of the injection of the first quantity of fuel, a second quantity of fuel is injected.

In another aspect of the present invention, there is a method of reducing $NO_x$ and smoke emissions from an engine at idle. First, the $NO_x$ emissions are reduced, at least in part, by injecting a first quantity of fuel during a compression stroke. After the first quantity of fuel has been burned, smoke emissions are reduced, at least in part, by injecting a second quantity of fuel.

In yet another aspect of the present invention, there is a method of determining operating conditions of an engine that reduce emissions at idle. First, an idle delivery quantity is determined. Second, the idle delivery quantity is divided into an injection of a first quantity of fuel and an injection of a second quantity of fuel of approximately equal quantities. The injection of the first quantity of fuel is then separated from the injection of the second quantity of fuel by a predetermined timing angle. After measuring at least one of $NO_x$, hydrocarbon and smoke emissions of the engine at idle, the $NO_x$ emissions are reduced, at least in part, by adjusting at least one of the timing and the quantity of the injection of the first quantity of fuel. After again measuring at least one of the $NO_x$, smoke and hydrocarbon emissions of the engine at idle, the smoke emissions are reduced, at least in part, by adjusting at least one of the timing, injection pressure and quantity of the injection of the second quantity of fuel.

BRIEF DESCRIPTION OF THE DRAWINGS

FIG. 3 is a graph illustrating injection quantity versus timing angle according to the present invention.

DETAILED DESCRIPTION

Figure 1:
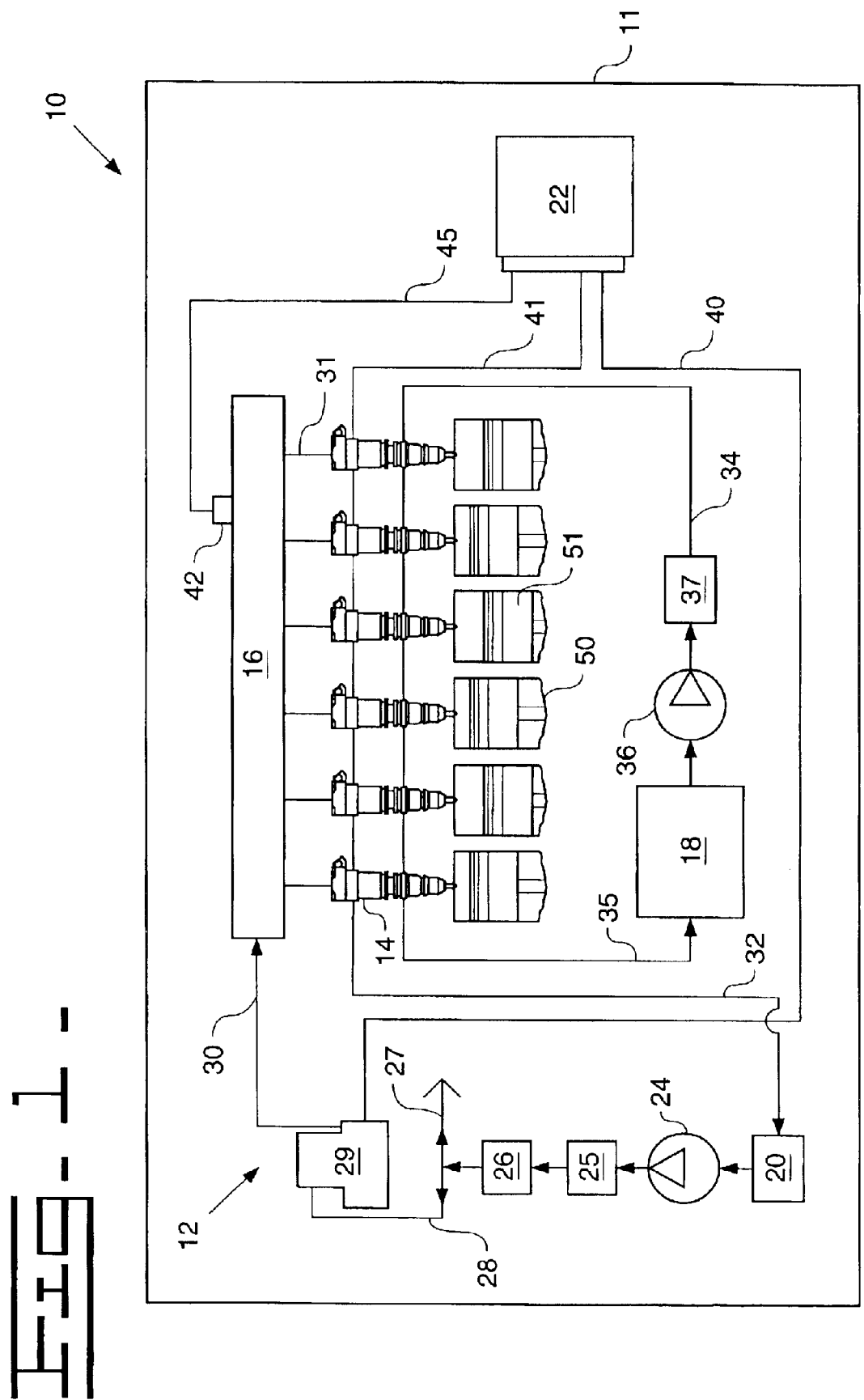
FIG. 1 is a schematic representation of an engine according to the present invention.

Referring to FIG. 1, there is shown a schematic representation of an engine 10 according to the present invention. A six cylinder diesel engine 10 includes an engine housing 11 and a common rail fuel injection system 12. The system 12 includes an individual fuel injector 14 for each engine cylinder 50, a single common rail 16, an oil sump 20 fluidly connected to the common rail 16, and a fuel tank 18 on a separate fluid circuit. Those skilled in the art will appreciate that in other applications there may be two or more separate common rails, such as a separate rail for each side of a V8 engine. An electronic control module 22 controls the operation of fuel injection system 12. The electronic control module 22 preferably utilizes advanced strategies to improve accuracy and consistency among the fuel injectors 14 as well as pressure control in common rail 16. For instance, the electronic control module 22 might employ electronic trimming strategies individualized to each fuel injector 14, to perform more consistently. This could be accomplished even in the presence of the inevitable performance variations due to such causes as realistic machining tolerances associated with the various components that make up the fuel injectors 14. In another strategy, the electronic control module 22 might employ a model based rail pressure control system that breaks up the rail pressure control issue into one of open loop flow control coupled with closed loop error and pressure control.

When fuel injection system 12 is in operation, oil is drawn from oil sump 20 by a low pressure oil circulation pump 24, and the outlet flow is split between an engine lubrication passage 27 and a low pressure fuel injection supply line 28 after passing through an oil filter 25 and a cooler 26. The oil in engine lubrication passage 27 travels through the engine 10 and lubricates its various components in a conventional manner. The oil in low pressure supply line 28 is raised to a medium pressure level (medium relative to extremely high injection pressures) by a high pressure pump 29. Pump 29 is preferably an electronically controlled variable delivery pump, such as a sleeve metered fixed displacement variable delivery pump of a type manufactured by Caterpillar, Inc. of Peoria Ill. High pressure pump 29 is connected to common rail 16 via a high pressure supply line 30. Each of the individual fuel injectors 14 are connected to common rail 16 via a separate branch passage 31. After being used within individual fuel injectors 14 to pressurize fuel, the oil leaves fuel injectors 14 and returns to the oil sump 20 for recirculation via a return line 32.

Fuel is drawn from a fuel tank 18 by a fuel transfer pump 36 and circulated among fuel injectors 14 via a fuel supply line 34 after passing through a fuel filter 37. Fuel transfer pump 36 is preferably a constant flow electric pump with a capacity sized to meet the maximum demands for engine 10. Also, the fuel transfer pump 36 and the fuel filter 37 are preferably contained in a common housing. Any fuel not used by the fuel injectors 14 is recirculated to fuel tank 18 via fuel return line 35. Fuel in the fuel supply and return lines 34 and 35 are at a relatively low pressure relative to that in common rail 16, which contains pressurized oil. In other words, fuel injection system 12 includes no high pressure fuel lines, and the fuel is only pressurized to injection levels within each individual fuel injector 14, and then for only a brief period of time during an injection sequence.

The fuel injection system 12 is controlled in its operation via an electronic control module 22 via control communication lines 40 and 41. Control communication line 40 communicates with the high pressure pump 29 and controls its delivery, and hence the pressure in the common rail 16. Control communication lines 41 include four wires, one pair for each electrical actuator within each fuel injector 14. These respective actuators within the fuel injectors 14 control the flow of actuation fluid to the injectors from the rail 16, and the opening and closing of the fuel injector spray nozzle. Electronic control module 22 determines its control signals based upon various sensor inputs known in the art. These include, among others, an oil pressure sensor 42 attached to the rail 16 that communicates an oil pressure signal via a sensor communication line 45.

The engine 10 has an engine housing 11 that defines a plurality of engine cylinders 50. Each of the engine cylinders 50 defined by the engine housing 11 has a movable piston 51. Each piston 51 is movable between a retracted, downward position and an advanced, upward position. For a typical four cycle diesel engine, the advancing and retracting strokes of the piston 51 correspond to the four stages of the engine operation. When the piston 51 retracts from its top dead center position to its bottom dead center position for the first time, it is undergoing its intake stroke and air can be drawn into the cylinder 50 via an intake valve. When the piston 51 advances from its bottom dead center position to its top dead center position for the first time it is undergoing its compression stroke and air within the cylinder 50 is compressed. During the compression stroke, a first quantity of fuel (as illustrated in FIG. 3 as "x") is injected into the engine cylinder 50. When the engine piston 51 reaches a timing angle at which the temperature and pressure is sufficiently high, approximately twenty degrees prior to top dead center of the compression stroke, combustion will occur. The fuel will ignite, driving the engine piston 51 downward toward its bottom dead center position, for the power stroke of piston 51. Once the fuel completely burns and at a timing angle at least thirty degrees after the first injection, the fuel injector 14 will inject a second quantity of fuel (as illustrated in FIG. 3 as "y") into the engine cylinder 50. Those skilled in the art should appreciate that, as used in this patent, "burned" means the flame has extinguished, even though lingering oxidation reactions could be continuing. The second quantity of fuel will combust and add energy to further drive any uncompleted combustion of the first quantity of fuel. Finally, when the piston 51 once again advances from its bottom dead center position to its top dead center position, post combustion products remaining in the engine cylinder 50 can be vented via an exhaust valve, corresponding with the exhaust stroke of the piston 51. While engine 10 has been illustrated as a four cycle, six-cylinder engine, it should be appreciated that any desired number of cylinders could be defined by the engine housing 11, and the engine 10 might operate in a two-cycle mode.

Figure 2:
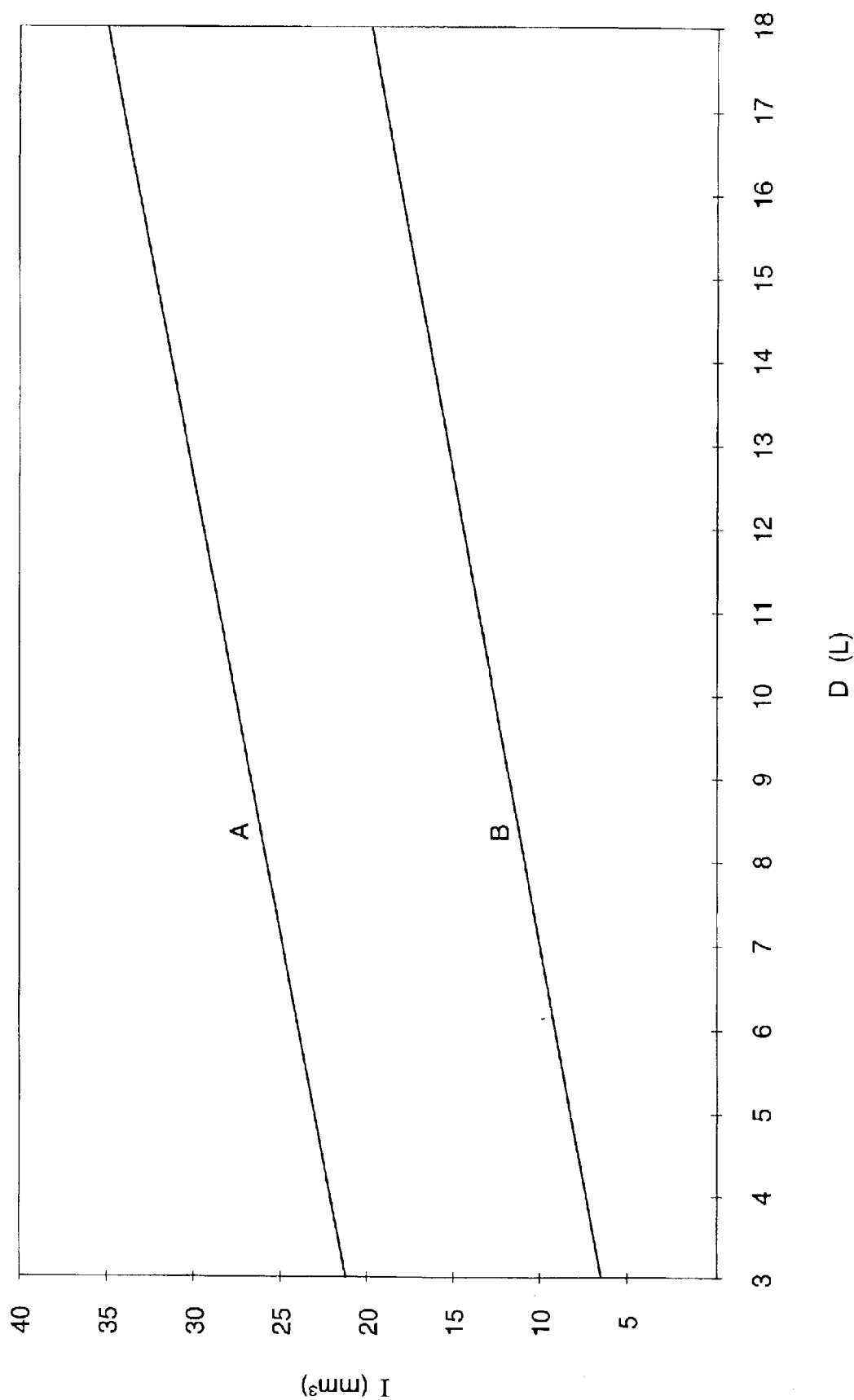
FIG. 2 is a graph illustrating idle delivery quantity versus engine displacement according to the present invention.

Referring to FIG. 2, there is shown a graph illustrating idle delivery quantity (I) versus engine displacement (D). The idle delivery quantity (I) is the quantity of fuel injected into the engine cylinder 50 during one four-stroke cycle of the engine piston 51. Because $NO_x$ emissions and hydrocarbon emissions are reduced as the quantity of fuel being injected into the engine cylinder 50 is reduced, the idle delivery quantity (I) is preferably the smallest quantity of fuel required to maintain engine operation at idle. The idle delivery quantity (I) is, at least in part, a function of the engine displacement (D) and the torque of the engine 10. The larger the engine displacement (D), the larger the idle delivery quantity (I) required to keep the engine 10 idling. Further, the engine 10 when coupled to an automatic transmission has a curb idle torque, which is shown as curve "A", requiring a relatively larger idle delivery quantity (I). The engine 10 when having a manual transmission has free idle torque, which is shown as curve "B", and requires a relatively smaller idle delivery quantity (I). For instance, a 3126 engine manufactured by Caterpillar, Inc. of Peoria, Ill., having a 7.2 liter engine displacement (D) and being coupled to an automatic transmission, has idle delivery quantity (D) of approximately 22–24 cubic millimeters.

Referring to FIG. 3, there is shown a graph illustrating injection quantity (Q) versus the timing angle (TA) of the engine piston 51. The idle delivery quantity (I), illustrated in FIG. 2, is preferably proportioned between the first quantity of fuel (x) and the second quantity of fuel (y) in approximately equal quantities. Thus, the first quantity of fuel (x) and the second quantity of fuel (y), each could include any proportion of the idle delivery quantity (I) between fifty percent, plus or minus ten percent. The reapportioning of the idle delivery quantity (I) between the first quantity of fuel (x) and the second quantity of fuel (y) can alter $NO_x$, hydrocarbon and smoke emissions. However, the reapportioning is limited such that neither the first quantity of fuel (x) nor the second quantity of fuel (y) will exceed sixty percent of the idle delivery quantity (I). For example, FIG. 3 illustrates the first quantity of fuel (x) and the second quantity of fuel (y) as equal proportions of the idle delivery quantity (I) for the 3126 engine manufactured by Caterpillar, Inc. of Peoria, Ill. Thus, both the first quantity of fuel (x) and the second quantity of fuel (y) equal approximately 11–12 cubic millimeters.

FIG. 3 further illustrates the timing angle (TA) of the engine piston 51 as it undergoes its compression stroke and power stroke. Timing angle 0° is top dead center in the compression stroke. As the engine piston 51 advances from bottom dead center of its compression stroke, the first quantity of fuel (x) is injected into the engine cylinder 51. The injection of the first quantity of fuel (x) preferably is timed such that it occurs at a timing angle theta, which is between forty and fifteen degrees before the engine piston 51 reaches top dead center of the compression stroke. FIG. 3 illustrates the injection of the first quantity of fuel (x) occurring at a timing angle of twenty-eight degrees prior to top dead center in the compression stroke. Twenty-eight degrees before top dead center in the compression stroke is the preferred timing angle of the first injection for the 3126 engine discussed earlier. However, those skilled in the art will appreciate that the exact timing angle theta is affected by many variables, and may fall at any timing angle (TA) within forty to fifteen degrees before top dead center in the compression stroke. The injection of the first quantity of fuel (x) preferably has a duration of approximately ten degrees, but could vary depending upon the idle speed and injection pressure. The fuel injector 14 preferably injects the fuel at about a constant rate, but could potentially be rate shaped, if desired, and if the fuel injector 14 has that ability. Thus, as preferred in the 3126 engine, the fuel injector 14 injects approximately 1.2 cubic millimeter of fuel for each degree over the timing angle of about ten degrees.

The second quantity of fuel (y) is injected at a timing angle that is preferably at least thirty degrees after the first quantity of fuel (x) is injected. Although the second quantity of fuel (y) is illustrated as fifty percent of the idle delivery quantity (I), it should be appreciated that the second quantity of fuel (y) could equal between sixty percent and forty percent of the idle delivery quantity (I). The injection of the second quantity of fuel (y) is timed such that it occurs at a timing angle beta which is between top dead center in the compression stroke and twenty degrees after top dead center in the power stroke. FIG. 3 illustrates the injection of the second quantity of fuel (y) occurring approximately at the timing angle of twelve degrees after top dead center. Twelve degrees after top dead center is the preferred timing angle of the second injection for the 3126 engine. However, those skilled in the art will appreciate that the exact timing angle beta is affected by many variables and may fall at different degrees between top dead center and twenty degrees after top dead center. Further, the duration of the injection of the second quantity of fuel (y) is preferably on the order of about ten degrees for the illustrated example. Thus, as with the injection of the first quantity of fuel (x) as illustrated for the 3126 engine, the fuel injector 14 will preferably inject the second quantity of fuel (y) at a constant rate of approximately 1.2 cubic millimeter per one degree over a ten-degree duration. However, those skilled in the art will recognize that further advantages might be recognized if the injection system has rate shaping capabilities for small idle quantities.

The timing angle between the injection of the first quantity of fuel (x) and the second quantity of fuel (y) is preferably of a duration that allows the fuel injector 14 to reset itself, but such is not required. Thus, the timing angle of at least thirty degrees between the injection of the first quantity of fuel (x) and the second quantity of fuel (y) is long enough that the components of the fuel injector 14 retract to their deactivated positions prior to activating for the second injection event. Further, the injection of the second quantity of fuel (y) should not occur until after the first quantity of fuel (y) has been burned. Those skilled in the art should appreciate that although the second fuel injection should not occur until after the first fuel injection has ignited and the flame has extinguished, the first fuel injection may be undergoing lingering chemical reactions caused by the heat from the burn when the second injection occurs. Thus, as used in this patent, "burned" means the flame has extinguished, even though lingering oxidation reactions could be continuing. The injection pressure of both the injection of the first quantity of fuel (x) and the second quantity of fuel (y) can be adjusted by adjusting rail pressure in a known manner. Those skilled in the art should appreciate that both the first quantity of fuel (x) and the second quantity of fuel (y) will have approximately the same injection pressure. However, it might be desirable to inject at different pressures, assuming the injection system has that capability.

INDUSTRIAL APPLICABILITY

Referring to FIGS. 1–3, the methods set forth in the present invention will be discussed for the operation at idle of any engine 10 having an idling speed between 600–900 rpms. It should be appreciated that the methods of the present invention can be applied to the operation of engines with varying engine displacement (D) and fuel injectors and could also apply to different idling speeds with an appropriate adjustment. Although the operation of the engine 10 will be discussed for one engine cylinder 50, it should be appreciated that the methods set forth in the present invention are applicable to each engine cylinder 50 defined by the engine housing 11.

In order to operate the engine 10 at idle such that $NO_x$ and smoke emissions are reduced, the preferred injection strategy for the particular engine 10 at idle must be determined. The first step in determining an injection sequence of the engine 10 that reduces emissions at idle is to determine the idle delivery quantity (I). The idle delivery quantity (I) is the quantity of fuel injected into the engine cylinder 50 during one four-stroke cycle of the engine piston 51. Because the idle delivery quantity is affected by both the engine displacement (D) and the torque of the engine 10, the idle delivery quantity (I) will vary from engine to engine. If the vehicle or machinery has an automatic transmission, the engine 10 will have a curb idle torque and the idle delivery quantity (I) will lie along line "A". If the vehicle or machinery has a manual transmission, the engine 10 will have a free idle torque and the idle delivery quantity will lie along line "B". As the engine displacement (D) increases, the idle delivery quantity (I) also increases. For instance, the 3126 engine having a 7.2 liter engine displacement (D) and a curb idle torque (A) has the idle delivery quantity (I) of approximately 22–24 cubic millimeters. Thus, at idle, the fuel transfer pump 36 will supply to each fuel injector 14 at least 22–24 millimeters to inject into the respective engine cylinder 50 during one four-stroke cycle of the engine piston 51.

After determining the idle delivery quantity (I) for the engine 10, the next step is to divide the idle delivery quantity (I) into the injection of the first quantity of fuel (x) and the injection of the second fuel injection (y) of approximately equal quantities. Although it is preferred that the first quantity of fuel (x) and the second quantity of fuel (y) each equal fifty percent of the idle delivery quantity (I), it should be appreciated that the first quantity of fuel (x) could equal from forty to sixty percent of the idle delivery quantity (I) and the second quantity of fuel (y) could equal the corresponding percentage of the idle delivery quantity (I). As illustrated in FIG. 3, the idle delivery quantity (I) for the 3126 engine manufactured by Caterpillar, Inc. of Peoria, Ill. is preferably divided between the first quantity of fuel (x)

and the second quantity of fuel (y) in equal amounts. Thus, both the first quantity of fuel (x) and the second quantity of fuel (y) equal approximately 11–12 cubic millimeters.

After dividing the idle delivery quantity (I) between the first quantity of fuel (x) and the second quantity of fuel (y), the next step is to determine the timing of the injection of the first quantity of fuel (x) and the injection of the second quantity of fuel (y). The injection of the first quantity of fuel (x) occurs while the engine piston 51 is advancing during its compression stroke. Preferably, the first quantity of fuel (x) should be injected into the engine cylinder 50 at a beginning timing angle theta which is between forty to fifteen degrees before the engine piston 51 reaches top dead center in its compression stroke. Regardless of the timing angle at which the first injection of fuel occurs, due to the temperature and pressure within the engine cylinder 51, the ignition of the first quantity of fuel (x) occurs at approximately twenty degrees prior to top dead center in the compression stroke. If the first quantity of fuel (x) is injected after twenty degrees before top dead center, the first quantity of fuel will likely not auto ignite. The fuel injector 14 will inject the first quantity of fuel (x) for approximately ten degrees in the illustrated example. By injecting the first quantity of fuel (x) at timing angle theta between forty to fifteen degrees before the engine piston 51 reaches top dead center, the $NO_x$ emissions, at least in part, can be reduced at idle.

The second quantity of fuel (y) preferably is injected into the engine cylinder 50 at a timing angle of at least thirty degrees after the injection of the first quantity of fuel (y). Thus, the second quantity of fuel (y) is preferably injected into the engine cylinder 50 at the timing angle beta that begins between top dead center in the compression stroke and twenty degrees after the engine piston 51 reaches top dead center in the power stroke. The engine piston 51 will advance approximately ten degrees while the injection occurs. The timing angle of at least thirty degrees separating the first injection (x) from the second injection (y) should allow time for the fuel injector 14 to reset itself for the second injection (y). Thus, during the timing angle of at least thirty degrees, the electronic control module 22 will deactivate the fuel injector 24 via the fuel injector communication line 41 allowing the components of the fuel injector 14 to retract and reset. Approximately when the engine piston 51 reaches its timing angle beta, the electronic control module 22 will activate the fuel injector 14 by sending electric current through a solenoid that ultimately opens fluid communication between the fuel injector 14 and the pressurized oil in the common rail 16. Also, the predetermined timing angle of at least thirty degrees preferably provides adequate time for the first quantity of fuel (x) to ignite and burn prior to the injection of the second quantity fuel (y). The injection of the second quantity of fuel (y) should add mixing energy to the lingering byproducts and remaining hydrocarbons, enhancing the oxidation of soot. Thus, the timing of the second injection, at least in part, can reduce soot emissions at idle.

In order to determine if any adjustments to the timing and the quantities of the injections of fuel are needed, the next step is to measure at least one of the $NO_x$ and the smoke emissions of the engine 10 at idle. Preferably, the $NO_x$ emissions are measured and reduced before the smoke emissions are addressed. If the $NO_x$ emissions are at a higher level than desired, the $NO_x$ emissions can be reduced, at least in part, by adjusting at least one of the timing and the quantity of the injection of the first quantity of fuel (x). The first quantity of fuel (x) can be adjusted to occur as early in the compression stroke as forty degrees before the engine piston 51 reaches top dead center or as late in the compression stroke as fifteen degrees before the engine piston 51 reached top dead center of the compression stroke. As illustrated for the 3126 engine produced by Caterpillar, Inc. of Peoria Ill., the preferred timing angle of the first injection is twenty-eight degrees prior to top dead center in the compression stroke. Further, the first quantity of fuel (y) can be adjusted to equal as little as forty percent of the previously determined idle delivery quantity (I) or as much as sixty percent of the previously determined idle delivery quantity (I). It should be appreciated that in several engines, the electronic control module 22 will adjust the second quantity of fuel (y) in response to any adjustment to the first quantity of fuel (x) such that the second quantity of fuel (x) and the first quantity of fuel (y) still equal the idle delivery quantity (I). The relative apportionment of the fuel between the first and second injections affects the hydrocarbon emissions, and should be balanced accordingly.

In order to determine whether the adjustments to the first injection of fuel (x) has affected emissions, at least one of $NO_x$ and smoke emissions of the engine 10 at idle should be measured. If the $NO_x$ emissions are still not at the desired level, at least one of the timing and the quantity of the first injection of fuel (x) should be adjusted, and the $NO_x$ emissions measured until the desired level of $NO_x$ emissions is reached. However, by adjusting at least one of the timing and the quantity of the first injection of fuel in order to reduce the $NO_x$ emissions, the hydrocarbon and smoke emissions may have increased. Thus, the hydrocarbon and smoke emissions preferably are measured along with the $NO_x$ emissions. If the $NO_x$ emissions are measured at the desired level and the hydrocarbon and smoke emissions are measured at a higher level than desired, the next step is to reduce these emissions, at least in part, by adjusting at least one of the timing, injection pressure, and quantity of the injection of the second quantity of fuel (y). Preferably, the timing of the injection of the second quantity of fuel (y) is adjusted prior to adjusting the quantity of the second injection. The injection of the second quantity of fuel (y) can occur at any timing angle between top dead center in the compression stroke and twenty degrees after the engine piston 51 reaches top dead center in the power stroke. Preferably, adjusting the timing of the injection of the second quantity of fuel (y) to occur closer to top dead center of the compression stroke reduces hydrocarbon emissions. However, it should be appreciated that the first injection of fuel and the second injection of fuel will always remain separated by at least the thirty-degree timing angle in order to allow the first quantity of fuel (x) to burn. As illustrated for the 3126 engine produced by Caterpillar, Inc. of Peoria Ill., the preferred timing angle of the injection of the second quantity of fuel (y) is twelve degrees after the engine piston 51 reached top dead center in the power stroke.

After adjusting the second injection of fuel (y) and injection pressure, the hydrocarbon and smoke emissions of the engine 10 at idle should be measured. If the smoke emissions are not at the desired level, the injection pressure can be adjusted while maintaining the overall idle delivery quantity (I). Preferably, by increasing injection pressure smoke emissions will decrease with only a small increase in $NO_x$ emissions. Generally, injection pressure is reduced to a relatively low injection pressure at idle conditions and increased to a relatively high injection pressure at a loaded operating condition. In one method for adjusting the injection pressure, the electronic control module 22 will communicate with the high pressure pump 29 via the pump communication line 40. The high pressure pump 29 will adjust the supply of pressurized oil to the common rail 16 and the fuel injectors 14. The step of adjusting injection pressure preferably is preformed after the step of adjusting the second quantity of fuel (y) while maintaining the idle delivery quantity (I), although it should be appreciated that adjusting the injection pressure could occur at any point in the method. Because the pressure within the common rail 16 is difficult to alter during the timing angle separating the first injection of fuel and the second injection of fuel, the injection pressure is the same for both the first injection and second injection of fuel in the illustrated embodiment.

Overall, the present invention is advantageous because it provides a method for operating the engine 10 at idle that reduces $NO_x$ and smoke emissions from the engine 10 without utilizing exhaust after treatment techniques. The present invention reduces emissions by applying a method of more efficiently operating the fuel injection system at idle. By replacing exhaust treatment techniques with the method of improving the existing fuel injection system 12, the costs of manufacturing are reduced. Further, by recognizing the variables that affect emissions at idle, such as injection timing, injection quantities and injection pressure, ideal operating conditions can be determined for engines of varying sizes and varying types, such as engines utilizing automatic transmissions or differing fuel injectors. In addition, the present invention is advantageous because it has resulted in acceptable levels of smoke and hydrocarbon emissions and reductions in $NO_x$ emissions. By injecting the first quantity of fuel at a timing angle prior to top dead center in the compression stroke, $NO_x$ emissions have been reduced by up to seventy-five percent. By injecting the second quantity of fuel at a timing angle of at least thirty degrees after the first fuel injection, smoke levels are reduced. Further, because the first fuel injection and the second fuel injection are separated by at least a thirty degree timing angle, the fuel injector 14 has sufficient time to reset itself.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A method of operating an engine at idle, comprising the steps of:
    injecting a first quantity of fuel during a compression stroke of an engine piston; and
    injecting a second quantity of fuel at a timing angle of at least thirty degrees after the start of the injection of the first quantity; and
    each of the first quantity of fuel and the second quantity of fuel is between forty and sixty percent of the sum of the first quantity of fuel and the second quantity of fuel.

2. A method of operating an engine at idle, comprising the steps of:
    injecting a first quantity of fuel during a compression stroke of an engine piston;
    injecting a second quantity of fuel at a timing angle of at least thirty degrees after the start of the injection of the first quantity; and
    resetting a fuel injector between the injection of the first quantity of fuel and the injection of the second quantity of fuel.

3. The method of claim 1 wherein the step of injecting the first quantity of fuel includes a step of timing the first injection such that it occurs at a timing angle between forty and fifteen degrees before the engine piston reaches top dead center in the compression stroke.

4. The method of claim 3 wherein the step of injecting the second quantity of fuel includes a step of timing the second injection such that it occurs at a timing angle between top dead center and twenty degrees after the engine piston reaches top dead center.

5. A method of operating an engine at idle, comprising the steps of:
    injecting a first quantity of fuel during a compression stroke of an engine piston;
    injecting a second quantity of fuel at a timing angle of at least thirty degrees after the start of the injection of the first quantity; and
    proportioning an idle delivery quantity between the first quantity of fuel and the second quantity of fuel in approximately equal quantities.

6. A method of operating an engine at idle, comprising the steps of:
    injecting a first quantity of fuel during a compression stroke of an engine piston;
    injecting a second quantity of fuel at a timing angle of at least thirty degrees after the start of the injection of the first quantity;
    wherein the step of injecting the second quantity of fuel includes a step of timing the second injection such that it occurs at a timing angle between top dead center and twenty degrees after the engine piston reaches top dead center;
    identifying an idle delivery quantity of fuel; and
    proportioning the idle delivery quantity between the first quantity of fuel and the second quantity of fuel in approximately equal quantities.

7. A method of operating an engine at idle, comprising the steps of:
    injecting a first quantity of fuel during a compression stroke of an engine piston;
    injecting a second quantity of fuel at a timing angle of at least thirty degrees after the start of the injection of the first quantity; and
    providing a relatively low injection pressure at idle and a relatively high injection pressure at a loaded operating condition.

8. A method of reducing $NO_x$ and smoke emissions from an engine at idle, comprising the steps of:
    reducing $NO_x$ emissions, at least in part, by injecting a first quantity of fuel during a compression stroke;
    reducing smoke emissions, at least in part, by injecting a second quantity of fuel after the first quantity of fuel has been burned; and
    each of the first quantity of fuel and the second quantity of fuel is between forty and sixty percent of the sum of the first quantity of fuel and the second quantity of fuel.

9. A method of reducing $N_x$ and smoke emissions from an engine at idle, comprising the steps of:
    reducing $NO_x$ emissions, at least in part, by injecting a first quantity of fuel during a compression stroke;
    reducing smoke emissions, at least in part, by injecting a second quantity of fuel after the first quantity of fuel has been burned; and
    proportioning an idle delivery quantity of fuel between the first quantity of fuel and the second quantity of fuel in approximately equal quantities.

10. The method of claim 9 wherein the step of reducing smoke emissions includes a step of increasing injection pressure.

11. The method of claim 10 including a step of controlling hydrocarbon emissions at least in part by reapportioning a portion of the second quantity of fuel to the first quantity of fuel.

12. A method of reducing $NO_x$ and smoke emissions from an engine at idle, comprising the steps of:

reducing $NO_x$ emissions, at least in part, by injecting a first quantity of fuel during a compression stroke;

reducing smoke emissions, at least in part, by injecting a second quantity of fuel after the first quantity of fuel has been burned;

reducing smoke emissions, at least in part by, increasing injection pressure; and controlling hydrocarbon emission, at least in part, by reapportioning a portion of the second quantity of fuel to the first quantity of fuel.

13. The method of claim 9 wherein the step of reducing hydrocarbon emissions includes a step of adjusting the timing of the injection of the second quantity of fuel to be closer to top dead center.

14. The method of claim 8 wherein the step of reducing $NO_x$ emissions includes a step of timing the injection of the first quantity of fuel such that it occurs at a timing angle between forty and fifteen degrees before an engine piston reaches top dead center in the compression stroke.

15. The method of claim 14 wherein the step of reducing smoke emissions includes a step of timing the injection of the second quantity of fuel such that it occurs at a timing angle between top dead center and twenty degrees after the engine piston reaches top dead center in the compression stroke.

16. A method of determining operating conditions of an engine that reduce emissions at idle, comprising the steps of:

determining an idle delivery quantity;

dividing the idle delivery quantity into an injection of a first quantity of fuel and an injection of a second quantity of fuel of approximately equal quantities;

separating the injection of the first quantity of fuel from the injection of a second quantity of fuel by a predetermined timing angle;

measuring at least one of $NO_x$, hydrocarbon and smoke emissions of the engine at idle;

reducing $NO_x$ emission, at least in part, by adjusting at least one of timing and quantity of the injection of the first quantity of fuel;

measuring at least one of $NO_x$, hydrocarbon and smoke emissions of the engine at idle; and reducing smoke emissions, at least in part, by adjusting at least one of timing and quantity of the injection of the second quantity of fuel.

17. The method of claim 16 wherein the step of dividing includes the step of proportioning the idle delivery quantity into the injection of the first quantity of fuel and the injection of the second quantity of fuel in equal quantities.

18. The method of claim 16 wherein the step of reducing hydrocarbon emissions includes steps of:

adjusting timing of the injection of the second quantity of fuel;

measuring hydrocarbon emission of the engine at idle; and adjusting the quantity of the injection of the second quantity of fuel while maintaining the idle delivery quantity.

19. The method of claim 18 including a step of reducing smoke emissions, at least in part, by adjusting injection pressure after performing the step of adjusting the second quantity of fuel while maintaining the idle delivery quantity.

20. The method of claim 16 wherein the step of reducing smoke emissions includes a step of adjusting injection pressure.

* * * * *